July 28, 1959  L. D. RIGSBY  2,896,805
COTTON BALE RESAMPLING AND BREAKOUT DEVICE
Filed Aug. 4, 1958  2 Sheets-Sheet 1

INVENTOR,
Lonnie D. Rigsby

July 28, 1959 — L. D. RIGSBY — 2,896,805
COTTON BALE RESAMPLING AND BREAKOUT DEVICE
Filed Aug. 4, 1958 — 2 Sheets-Sheet 2
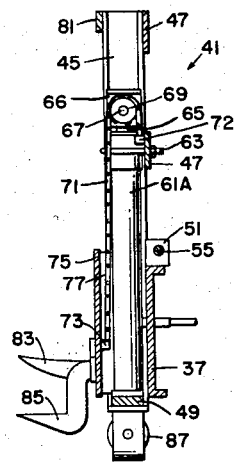
INVENTOR,
Lonnie D. Rigsby

United States Patent Office 2,896,805
Patented July 28, 1959

1

2,896,805
COTTON BALE RESAMPLING AND BREAKOUT DEVICE

Lonnie D. Rigsby, Memphis, Tenn.

Application August 4, 1958, Serial No. 752,900

7 Claims. (Cl. 214—620)

This invention relates to certain new and useful improvements in means for handling cotton bales, particularly when stored in compresses or warehouses, in order to enable warehouse or other personnel to obtain access to a stored bale, particularly for the purpose of withdrawing such stored bale even from a tier of bales in which it is superposed by one or more other bales for the purpose of further inspection, sampling, or other such uses as may be desired.

When it is appreciated that it is common practice in warehouses or compresses to store cotton bales in tiers comprising a plurality of bales which rise to a substantial height, and that the occasion often arises when one or more of the bales in a particular tier of bales may require inspection or sampling, and in some instances resampling and other handling, it will be seen that a substantial difficulty presents itself heretofore requiring the removal of the superposed bale or bales from a selected bale in such tier which it is desired to inspect or otherwise handle, and which has resulted in an extended expenditure of time and effort in order to obtain access to the specified and desired bale.

The present invention is primarily directed toward providing means for handling bales in tiers in such manner as to eliminate the necessity for the excess expenditure of time and effort which has heretofore been required. The present invention accomplishes this purpose by providing lift means which are adapted to be adjusted to height in order to engage the bale above the selected bale which requires handling, and which device is capable of effecting lift upon the superposed bale or bales in order to free the selected bale for access, and in which device there are provided means by which the selected bale thus freed from the weight of the superposed bales may be withdrawn from the tier to such extent as may be necessary to permit the inspection or sampling or other handling as may be desired.

The principal object of the present invention is to provide a new, novel and useful means for the handling of cotton bales, particularly when in storage.

A further object of the invention is to provide in such means a mobile industrial truck comprising means for vertical placement and horizontal positioning, together with bale-engaging means carried by the distal ends of the horizontal positioning means.

A further object of the invention is to provide in such a device bale-engaging means which comprise vertical frames rigidly secured to horizontal positioning means, and including vertically movable means comprising bale-engaging means.

A further object of the invention is to provide in such a device vertically disposed frames carrying such bale-engaging means in which the frames are disposed forwardly of the mobile truck and means carried thereby in order to provide an operational bale shifting space forwardly of such mobile truck.

A further object of the invention is to provide in such a device lateral frames vertically disposed and carrying a plurality of bale-engaging prongs, together with means for lifting the bale-engaging prongs in order to elevate a bale engaged thereby.

A further object of the invention is to provide in such a device, means for utilizing one or the other of the vertically disposed prong-carrying frames for the purpose of effecting pull upon a bale subjacent to a prong-engaged and lifted bale.

A further object of the invention is to provide such a device in which a superposed bale may be engaged by the prongs carried by one vertically disposed frame and the pull on the subjacent bale exerted by the opposite vertically disposed frame through the means of a connector extending from such opposite frame to the subjacent bale and detachably connected with the opposite frame so that upon vertical movement of the opposite vertical frame a pull is exerted upon the subjacent bale; and A further object of the invention is generally to improve the design, construction and efficiency of means for handling cotton bales in stored condition.

The means by which the foregoing and other objects of the present invention are accomplished and the manner of their accomplishment will be readily understood from the following specification upon reference to the accompanying drawings, in which:

Fig. 3 is a cross sectional view taken as on line III—III of Fig. 2.

Fig. 4 is a fragmentary sectional plan view taken as on the line IV—IV of Figs. 1 and 2.

Fig. 5 is a front elevational view of the device previously shown, under use conditions; and Fig. 6 is a somewhat schematic and diagrammatic view of controls for the operation of the device.

Figure 1:
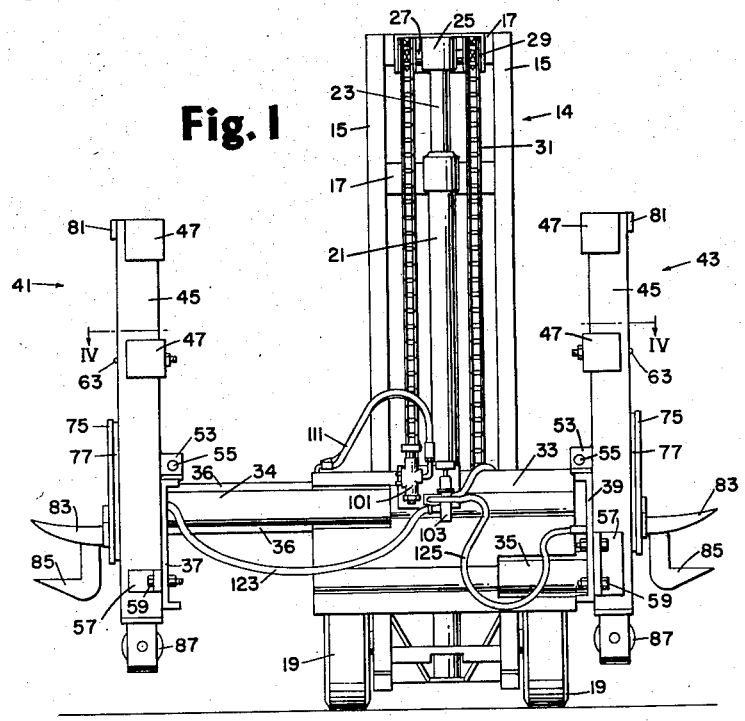
Fig. 1 is a front elevational view illustrating an embodiment of the present invention.
Figure 2:
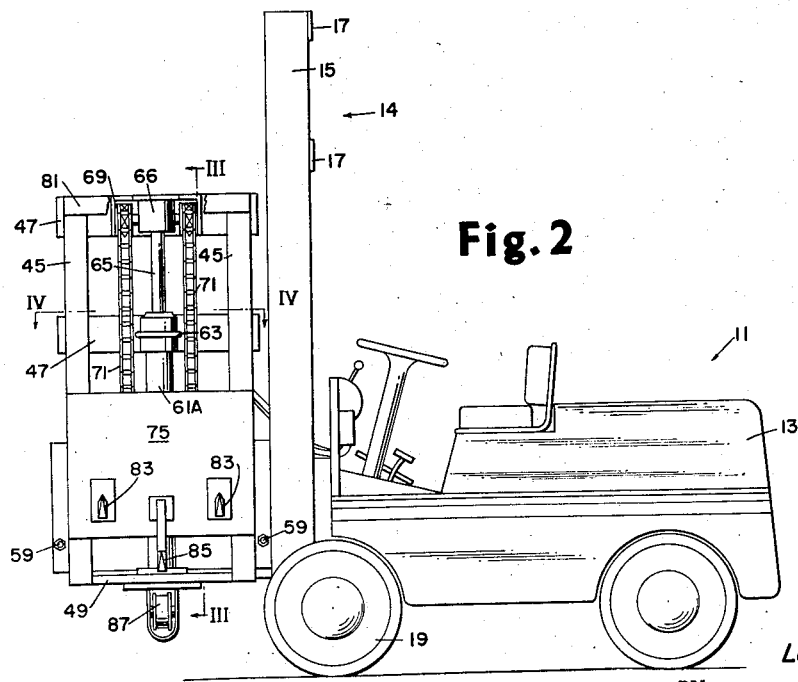
Fig. 2 is a side elevational view of the device shown in Fig. 1, with certain parts broken away.

Referring now to the drawings in which the various parts are indicated by numerals, the devices of the present invention are mounted upon and carried by a mobile industrial truck 11, which is preferably powered by a suitable motor contained within the housing 13.

Rigidly fixed to the forward portion of the truck 11 is a vertically disposed frame 14 comprising a pair of side rails 15 coupled together by cross members 17. Side rails 15 are disposed substantially vertically and preferably comprise respectively channel members which are faced toward each other in order to provide guideway means. The lower ends of side rails 15 extend downwardly between the forward portions of front wheels 19 of truck 11 and extend vertically upwardly substantially above the level of the truck.

Housed between rails 15 is a hydraulic lift cylinder assembly 21 having an upwardly extending piston rod 23 with a head 25 being connected to the upper end of piston rod 23, head 25 carrying horizontally disposed spindle means 27 upon which are mounted sprockets 29. Trained about sprockets 29 are sprocket chains 31, one end of the chains 31 being fixed to one of the cross members 17 in order to connect the chains to the vertical frame and other end of chains 31 being fixed to a box-like housing 33 disposed forwardly of side rails 15 and preferably including means (not shown) connected with the housing 33 and riding within the channels of side rails 15 for guiding purposes. It will be seen that upon operation of the lift cylinder assembly 21, head 25 is elevated, moving with it sprockets 29 and consequently through the connections of sprocket chains 31 to housing 33 effecting elevation of the housing 33 upwardly along side rails 15.

Slidably and reciprocably mounted in housing 33 are a pair of horizontally disposed, hydraulically operated extension arms 34, 35. These arms are respectively arranged for extension either jointly or severally from housing 33 to an extended position and to be retracted from each extended position into a retracted position in which the arms are substantially contained within housing 33. Each of the arms is preferably provided with guide ribs 36 engaging with a suitable guideway formed in housing 33. Arm 34 for example may be extended or retracted independently of the arm 35 and conversely the arm 35 may also be independently operated. Each of the arms is so controlled that when it has been positioned in a selected position, it is held in such position through the operation of its control means.

Each of the arms 34, 35 has rigidly fixed to its distal end, preferably as by welding, a rigid, substantially channel shaped plate, the plate attached to arm 34 being designated as plate 37 and that attached to arm 35 as plate 39. The attachment of plates 37, 39 to the respective arms 34, 35 is made adjacent the rearward edge of each of the plates 37, 39 so that the substantial majority of the extent of the respective plates is positioned forwardly of the arms 34, 35. The plates 37, 39 are disposed substantially parallel to the fore-and-aft axis of truck 11 and substantially perpendicular to frame 14.

Plates 37, 39 are provided as mounting plates for the lift frame attachments which comprise a special feature of this invention. Each of the plates 37, 39 is disposed with horizontal upper and lower flanges directed inwardly toward frame 14 and with flat surface of the web or body of each of the plates disposed vertically and facing outwardly. Butted against the outer flat surface of plates 37, 39 are the lift frame attachments 41, 43. Inasmuch as the lift frame attachments 41, 43 are substantially identical, it is thought that the description of one of these attachments will suffice.

Each of the lift frame attachments comprises a vertically disposed frame consisting of a pair of spaced apart tracks 45, formed of channel members, the tracks 45 being disposed to face toward each other and thereby to provide trackways. Tracks 45 are interconnected by a pair of straps 47 and a bottom plate 49. Straps 47 embrace tracks 45 and extend across the inward portions of tracks 45 and terminate adjacent but away from the outer edges of tracks 45 leaving the same free for sliding movement relative to the tracks.

Rigidly fixed to the upper flange, as of plate 37, is a bracket 51 having a suitable aperture therein and rigidly fixed to the respective tracks 45 at their inner surfaces and in horizontal alinement are a pair of brackets 53. For attaching a lift frame attachment 41 to plate 37, the brackets 51, 53 are brought into horizontal alinement and an elongated pin 55 is extended through the apertures in the brackets 51, 53, thus partly detachably connecting lift attachment 41 to plate 37. It will be observed that brackets 53 are connected to the respective tracks somewhat below the horizontal midline of the tracks and that the plate 37 is disposed beneath the brackets so that the plate 37 is attached to the attachment 41 adjacent the lower end of the attachment 41.

Additionally plate 37 is attached to tracks 45 through the medium of further brackets preferably in the form of angle brackets 57 which are detachably connected as by bolts 59 to plate 37 adjacent the lower edge of plate 37.

Thus it will be seen that the frame of attachment 41 is rigidly yet detachably connected to plate 37 and through plate 37 is thus operatably connected with horizontal arm 34.

Mounted in the frame of attachment 41 and disposed between tracks 45 is a hydraulic lift cylinder 61 which is vertically disposed and seated at its lower end upon bottom plate 49 and is anchored to the frame preferably as by the U bolt 63 which is fixed to one of the straps 47. Lift cylinder 61 operates in known manner to effect extension of the piston rod 65 to the end of which is fixed a head 66 carrying spindle means 67 upon which are mounted a pair of sprockets 69.

Trained about sprockets 69 are sprocket chains 71 attached as at 72 to one of the straps 47 and attached as at 73 to a slide plate 75 mounted for reciprocal vertical movement along the outer surface of tracks 45.

Slide plate 75 extends from side to side of attachment 41 and overlaps the outer surfaces of the respective tracks 45. Projecting inwardly from side plate 75 are a pair of brace members 77 which are rigidly fixed to the inner face of side plate 75 and project inwardly substantially perpendicular therefrom. The respective brace members 77 closely yet slideably engage the flanges of tracks 45 and each of the brace members 77 is provided with a guide roller 79 embraced within the channels of tracks 45 and vertically shiftable relative thereto, the engagement between tracks 45 and guide rollers 79 serving to guide the slide plate 75 in vertical movement relative to frame attachment 41.

At their upper ends tracks 45 are further connected by a stop bar 81 spanning across the outer surfaces of tracks 45 and disposed for engagement by the upper edges of brace members 77 when the slide plate 75 has reached the full limit of upward movement as illustrated for example in Fig. 5.

Rigidly fixed to and projecting outwardly from the outer surface of slide plate 75 are a set of prongs 83, 85. One or more of these prongs, as the prong 85, may be of substantial hook shape or the prongs may be substantially bayonet-like as the prongs 83. The prongs 83, 85 each carry sharpened ends for the ready insertion of the prong ends under applied pressure into an object such as a bale of cotton.

Mounted upon and suspended beneath the under surface of bottom plate 49 is a rotatable pulley 87 which is adapted to serve as a guide for a flexible line such as a chain 89, the use of which will be hereinafter described, the chain 89 being preferably provided with object engaging means such as the tongs 91.

As has already been stated inasmuch as the left frame attachments 41, 43 are substantially identical, the numbers hereinabove used to describe the elements of frame 41 are applied to the similar elements of frame 43, with like numerals applied to like parts in both frames 41 and 43 with the exception that the hydraulic lift cylinder associated with frame 43 is designated as 61A.

For the purpose of operating the devices of the present invention, suitable controls are provided and for ease of understanding of the operation a schematic and diagrammatic layout of a control system for the purpose of accomplishing the selective operation of the devices is shown in Fig. 6. It will be understood that, while the control system presents a system which is suitable for the purposes hereof, changes may be made in the control system and in the instrumentalities thereof without departing from the present invention. It further will be noted that in the present drawings, certain of the controls are illustrated as positioned forwardly of the industrial truck 11 and others as carried on the truck 11. This positioning of the controls is not material to the present invention and location of the same may be changed without departing herefrom. Thus, for example, all of the controls could be placed upon the dashboard of the industrial truck 11 or they may be otherwise located.

As shown in Fig. 6 the present device includes a sump 93, comprising a reservoir of hydraulic fluid, which is preferably housed within industrial truck 11 at any suitable location. Fluid under pressure may be withdrawn from the sump by a suitable pump 95 which may be separately powered or may be driven by the motor of the industrial truck 11. The fluid so withdrawn is delivered through a line 97 under pressure to a selector valve 99. Valve 99 is adapted to direct the flow of fluid under pressure either to main lift cylinder 21, to a further selector valve 101 or to a third valve 103.

For the operation of the main lift cylinder 21 to extend piston rod 23 and effect lift of housing 33, valve 99 is positioned to deliver fluid under pressure from pump 95 into cylinder 21 to the desired extent of lift. The valve 99 may then be shifted cutting off the flow of fluid under pressure. For the delivery of fluid under pressure from valve 99 to cylinder 21, preferably a flow line 105 is provided. When the desired extent of lift has been accomplished through the activation of main cylinder 21, valve 99 may then be shifted so as to interrupt communication of fluid into line 105 and to maintain the fluid head in that line and in cylinder 21 so as to hold piston rod 23 in selected extended position and housing 33 at selected elevated position. Valve 99 may then be shifted to establish communication through a flow line 107 to valve 101.

Valve 101 may then be adjusted to direct the pressure flow into one or the other, or both, of the cylinders for operation of horizontal arms 34, 35. Thus, for the operation of arm 34, the cylinder 109 may be provided as shown on Fig. 6 and preferably housed within housing 33. Pressure flow for the extension of arm 34 may be delivered through flow line 111 and pressure flow for the retraction of arm 34 may be delivered to the opposite end of cylinder 109 through a flow line 113. Similarly pressure for extending arm 35 may be delivered through flow line 115 to a cylinder 117 shown in Fig. 6 and also preferably housed in housing 33, and through a flow line 119 retracting pressure may be delivered to the opposite end of cylinder 117 for retracting arm 35. Valve 101 is preferably adapted to direct the delivery of pressure selectively to the cylinders 109, 117 and under some circumstances may be adapted to deliver pressure to both of the cylinders simultaneously.

When the desired positioning of arm 34 or 35 or both has been established, valve 99 may then be shifted to cut off the delivery of pressure to the horizontal cylinders 109 or 117 maintaining the fluid head therein and maintaining the selected positioning of the horizontal arms 34, 35. Valve 99 may then be shifted to establish communication through a flow line 121 to valve 103, which valve is adapted to selectively direct pressure flow to cylinders 61, 61A respectively carried by the lift frame attachments 41, 43. Thus the valve 103 is connected by a flow line 123 to cylinder 61 and by a flow line 125 to cylinder 61A.

Discharge from the cylinder 61, 61A is effected under the influence of gravity when the valve 103 is positioned to establish communication between the flow line of the selected cylinder and a discharge line 127 communicated into a discharge line 129 leading from valve 101 to a main discharge line 131 leading from valve 99 and returning to the sump 93. Similarly discharge flow from cylinder 21 is effected under the influence of gravity returning the fluid through line 105 into valve 99 and thence through discharge line 131 to sump 93. As previously indicated retraction discharge from cylinders 109, 117 is accomplished by the delivery of pressure to the opposite end of the cylinders causing return flow of the fluid through the flow lines into the valve and thence through the discharge lines 129 into the discharge line 131 and thence to sump 93.

In the use and operation of the device of the present invention the mobile truck 11 may be driven down an aisleway in a cotton compress or warehouse to a point where one of the side frames, as the lift attachment frame 41, is opposite a tier of bales from which it is desired to select a bale for further handling for usage. With the device so positioned, valve 99 may be turned to activate cylinder 21 elevating housing 33 to the point where the prongs 83, 85 of the lift attachment frame are opposite the bale next above the bale which is to be handled. Thus, for example, as shown in Fig. 5, the lift attachment frame has been raised together with housing 33 until the prongs 83, 85 are at the level of a superposed bale 133 positioned next above the bale 135 which is to be handled.

With the housing 33 elevated to the proper height as selected, valve 99 is then shifted to communicate with valve 101 and from valve 101 fluid under pressure is delivered to cylinder 109 so as to extend horizontal arm 34 carrying frame 41 together with the slide plate and prongs 83, 85 carried thereby outwardly, driving the prongs 83, 85 into penetrating engagement with the end of bale 133, driving the prong thereinto substantially as shown in Fig. 5. With the prongs firmly engaged into bale 133, valve 99 may then be shifted to direct flow to valve 103 and by the operation of valve 103, pressure for activating lift cylinder 61 is delivered to the cylinder causing the elevation of side plate 75 and prongs 83, 85 carried thereby, thus lifting bale 133 and also any bale or bales that may be superposed thereabove.

With the bale 133 thus elevated, the subjacent bale 135 is freed for withdrawal from the tier. For the purpose of effecting such withdrawal, tongs 91 are engaged with the bale, chain 89 passed beneath pulley 87 of the opposite lift frame attachment 43, and the free end of the chain detachably engaged with one of the prongs as the prong 85 of frame 43. With bale 135 thus engaged by the tongs and the tongs connected to the side plate through the medium of chain 91, valve 103 is shifted to deliver lifting pressure to cylinder 61A of attachment 43 carrying upwardly the slide plate and prongs carried thereby, thus exerting a pull upon chain 91 connected to prong 85 and thus effecting a direct pull upon bale 135 removing same as desired from the tier of bales.

It will be observed that slide plate 75 is prevented from over-travelling beyond attachment frame 43 through the engagement of brace members 77 with stop bar 81 spanning across the top of frame 43. When the handling of the bale 135 has been concluded, the bale may be replaced in its original position if desired or under other circumstances, when the bale 135 has been removed from the tier, the bales remaining in the tier may be lowered into position. When the handling of the bale has been concluded, the valves are successively opened permitting the lowering by gravity of lift frame attachments 41, 43 and the lowering by gravity of main lift 21, pressure flow is reversed to the extended cylinder 109 retracting that cylinder within housing 33 restoring the device to its original condition under which it may be transported to another selected location.

It is found that with the use of the device of the present invention, the heretofore tedious operation of obtaining access to selected bales stored in tiers in compresses or warehouses has been greatly minimized and consequently the present device has proven to be of extreme value and of efficient utility in accomplishing its purposes while effecting a substantial saving in time and labor.

I claim:

1. In combination with an industrial truck, cotton bale handling means comprising a main lift connected to the front of said truck, a pair of horizontally disposed reciprocable arms forward of said lift, said arms extending oppositely transversely across said truck and each having a distal end, said distal ends being respectively disposed at opposite sides of said lift, means connecting said arms to said lift for raising and lowering said arms to establish a selected position of elevation of said arms, hydraulic means for selectively reciprocating said arms horizontally, a pair of plate-like members, the distal ends of said arms being respectively rigidly attached to the rearward part of said plate-like members, each said plate-like member being perpendicular to its related said arm and extending forwardly therefrom, a pair of lift frame attachment means respectively detachably connected to said plate-like members, whereby said lift frame attachments are respectively coupled to said distal ends for movement therewith; said lift frame attachment means each comprising a pair of opposed tracks, means interconnecting said tracks, means detachably fixing the inner part of the lower portion of said tracks to the outer face of its related said plate-like member, a slide plate mounted on and outwardly of said tracks, guide means, brace means attaching said guide means to said slide plate, said guide means engaging within said tracks, stop means carried by the upper and outer part of said tracks overlying said brace means for limiting upward movement of said slide plate relative to said tracks, hydraulic lift means mounted in and anchored to said lift frame attachment means between said tracks and coupled to said slide plate for raising and lowering said slide plate along said tracks; prongs fixed to and projecting outwardly from each said slide plate, pulley means suspended from each said lift frame attachment means, a chain detachably engaged with the prongs of one said slide plate and passing beneath the pulley of the lift frame attachment means related to said one slide plate, bale-engaging means carried by said chain, whereby the prongs of the other said slide plate may be forcibly inserted in a superposed cotton bale by horizontal extension of one said arm and lifted by said hydraulic lift means to free a subjacent bale and said subjacent bale engaged by said bale-engaging means and withdrawn from subjacent position by elevation of said one slide plate, and means selectively controlling operation of said main lift, said hydraulic means, and said hydraulic lift means.

2. In combination with an industrial truck, cotton bale handling means comprising a main lift connected to the front of said truck, a pair of horizontally disposed reciprocable arms, said arms extending oppositely transversely of said truck and each having a distal end, said distal ends being respectively disposed at opposite sides of said lift, means connecting said arms to said lift for raising and lowering said arms to establish a selected position of elevation of said arms, means for selectively reciprocating said arms horizontally, a pair of plate-like members, the distal ends of said arms being respectively rigidly attached to said plate-like members, each said plate-like member being perpendicular to its related said arm, a pair of lift frame attachment means respectively connected to said plate-like members, whereby said lift frame attachments are respectively coupled to said distal ends for movement therewith; said lift frame attachment means each comprising a pair of opposed tracks, means interconnecting said tracks, means detachably fixing said tracks to the outer face of its related said plate-like member, a slide plate mounted on and outwardly of said tracks, brace means attached to said slide plate, stop means carried by the upper and outer part of said tracks overlying said brace means for limiting upward movement of said slide plate relative to said tracks, hydraulic lift means mounted in and anchored to said lift frame attachment means between said tracks and coupled to said slide plate for raising and lowering said slide plate along said tracks; prongs fixed to and projecting outwardly from each said slide plate, pulley means suspended from each said lift frame attachment means, a chain detachably engaged with the prongs of one said slide plate and passing beneath the pulley of the lift frame attachment means related to said one slide plate, bale-engaging means carried by said chain, whereby the prongs of the other said slide plate may be forcibly inserted in a superposed cotton bale by horizontal extension of one said arm and lifted by said hydraulic lift means to free a subjacent bale and said subjacent bale engaged by said bale-engaging means and withdrawn from subjacent position by elevation of said one slide plate.

3. In combination with an industrial truck, cotton bale handling means comprising a main lift connected to the front of said truck, a pair of horizontally disposed reciprocable arms, said arms extending oppositely transversely across said truck and each having a distal end, said distal ends being respectively disposed at opposite sides of said lift, means connecting said arms to said lift for raising and lowering said arms to establish a selected position of elevation of said arms, hydraulic means for selectively reciprocating said arms horizontally, a pair of lift frame attachment means respectively detachably connected to said arms, whereby said lift frame attachments are respectively coupled to said arms for movement therewith; said lift frame attachment means each comprising a pair of opposed tracks, a slide plate mounted on and outwardly of said tracks, guide means, brace means attaching said guide means to said slide plate, said guide means engaging within said tracks, stop means carried by the upper and outer part of said tracks overlying said brace means for limiting upward movement of said slide plate relative to said tracks, hydraulic lift means mounted in and anchored to said lift frame attachment means between said tracks and coupled to said slide plate for raising and lowering said slide plate along said tracks; prongs fixed to and projecting outwardly from each said slide plate, pulley means suspended from each said lift frame attachment means, a chain detachably engaged with the prongs of one said slide plate and passing beneath the pulley of the lift frame attachment means related to said one slide plate, bale-engaging means carried by said chain, whereby the prongs of the other said slide plate may be forcibly inserted in a superposed cotton bale by horizontal extension of one said arm and lifted by said hydraulic lift means to free a subjacent bale and said subjacent bale engaged by said bale-engaging means and withdrawn from subjacent position by elevation of said one slide plate.

4. In combination with an industrial truck, cotton bale handling means comprising a main lift connected to the front of said truck, a pair of horizontally disposed reciprocable arms, said arms extending oppositely transversely across said truck and each having a distal end, said distal ends being respectively disposed at opposite sides of said lift, means connecting said arms to said lift for raising and lowering said arms to establish a selected position of elevation of said arms, means for selectively reciprocating said arms horizontally, a pair of lift frame attachment means respectively detachably connected to said arms, at opposite sides of said lift, whereby said lift frame attachments are respectively coupled to said arms for movement therewith; said lift frame attachment means each comprising a pair of opposed tracks, a slide plate mounted on and outwardly of said tracks, means for limiting upward movement of said slide plate relative to said tracks, hydraulic lift means mounted in and anchored to said lift frame attachment means between said tracks and coupled to said slide plate for raising and lowering said slide plate along said tracks; prongs fixed to and projecting outwardly from each said slide plate, pulley means suspended from each said lift frame attachment means, a chain detachably engaged with the prongs of one said slide plate and passing beneath the pulley of the lift frame attachment means related to said one slide plate, bale-engaging means carried by said chain, whereby the prongs of the other said slide plate may be forcibly inserted in a superposed cotton bale by horizontal extension of one said arm and lifted by said hydraulic lift means to free a subjacent bale and said subjacent bale engaged by said bale-engaging means and withdrawn from subjacent position by elevation of said one slide plate.

5. In combination with an industrial truck, cotton bale handling means comprising a main lift connected to said truck, a pair of horizontally disposed reciprocable arms, means connecting said arms to said lift for raising and lowering said arms to establish a selected position of elevation of said arms, means for selectively reciprocating said arms horizontally, a pair of lift frame attachment means respectively connected to said arms, whereby said lift frame attachments are respectively coupled to said arms for movement therewith; said lift frame attachment means each comprising a pair of opposed tracks, a slide plate mounted on and outwardly of said tracks, hydraulic lift means mounted in and anchored to said lift frame attachment means between said tracks and coupled to said slide plate for raising and lowering said slide plate along said tracks; prongs fixed to and projecting outwardly from each said slide plate, pulley means suspended from each said lift frame attachment means, a chain detachably engaged with the prongs of one said slide plate and passing beneath the pulley of the lift frame attachment means related to said one slide plate, bale-engaging means carried by said chain, whereby the prongs of the other said slide plate may be forcibly inserted in a superposed cotton bale by horizontal extension of one said arm and lifted by said hydraulic lift means to free a subjacent bale and said subjacent bale engaged by said bale-engaging means and withdrawn from subjacent position by elevation of said one slide plate.

6. In combination with an industrial truck, cotton bale handling means comprising a main lift connected to said truck, a pair of horizontally disposed reciprocable arms, said arms extending oppositely across said truck, means connecting said arms to said lift for raising and lowering said arms to establish a selected position of elevation of said arms, means for selectively reciprocating said arms horizontally, a pair of lift frame attachment means respectively detachably connected to said arms, whereby said lift frame attachments are respectively coupled to said arms for movement therewith; said lift frame attachment means each comprising a pair of opposed tracks, a slide plate slidably mounted on and outwardly of said tracks, hydraulic lift means mounted in and anchored to said lift frame attachment means between said tracks and coupled to said slide plate for raising and lowering said slide plate along said tracks; prongs fixed to and projecting outwardly from each said slide plate, whereby the prongs of a said slide plate may be forcibly inserted in a superposed cotton bale by horizontal extension of one said arm and lifted by said hydraulic lift means to free a subjacent bale.

7. In combination with an industrial truck, cotton bale handling means comprising a main lift connected to said truck, a pair of horizontally disposed reciprocable arms, means connecting said arms to said lift for raising and lowering said arms to establish a selected position of elevation of said arms, hydraulic means for selectively reciprocating said arms horizontally, a pair of lift frame attachment means respectively connected to said arms, whereby said lift frame attachments are respectively coupled to said arms for movement therewith; said lift frame attachment means each comprising a pair of opposed tracks, a slide plate slidably mounted on and outwardly of said tracks, means for limiting upward movement of said slide plate relative to said tracks, lift means mounted in and anchored to said lift frame attachment means between said tracks and coupled to said slide plate for raising and lowering said slide plate along said tracks; prongs fixed to and projecting outwardly from each said slide plate, whereby the prongs of a said slide plate may be forcibly inserted in a superposed cotton bale by horizontal extension of one said arm and lifted by said hydraulic lift means to free a subjacent bale, and means selectively controlling operation of said main lift, said hydraulic means, and said hydraulic lift means.

References Cited in the file of this patent

UNITED STATES PATENTS 2,837,231     Ross _____ June 3, 1958